(No Model.)  3 Sheets—Sheet 1.
J. A. GLEIXNER.
SEED SOWER.
No. 602,683. Patented Apr. 19, 1898.
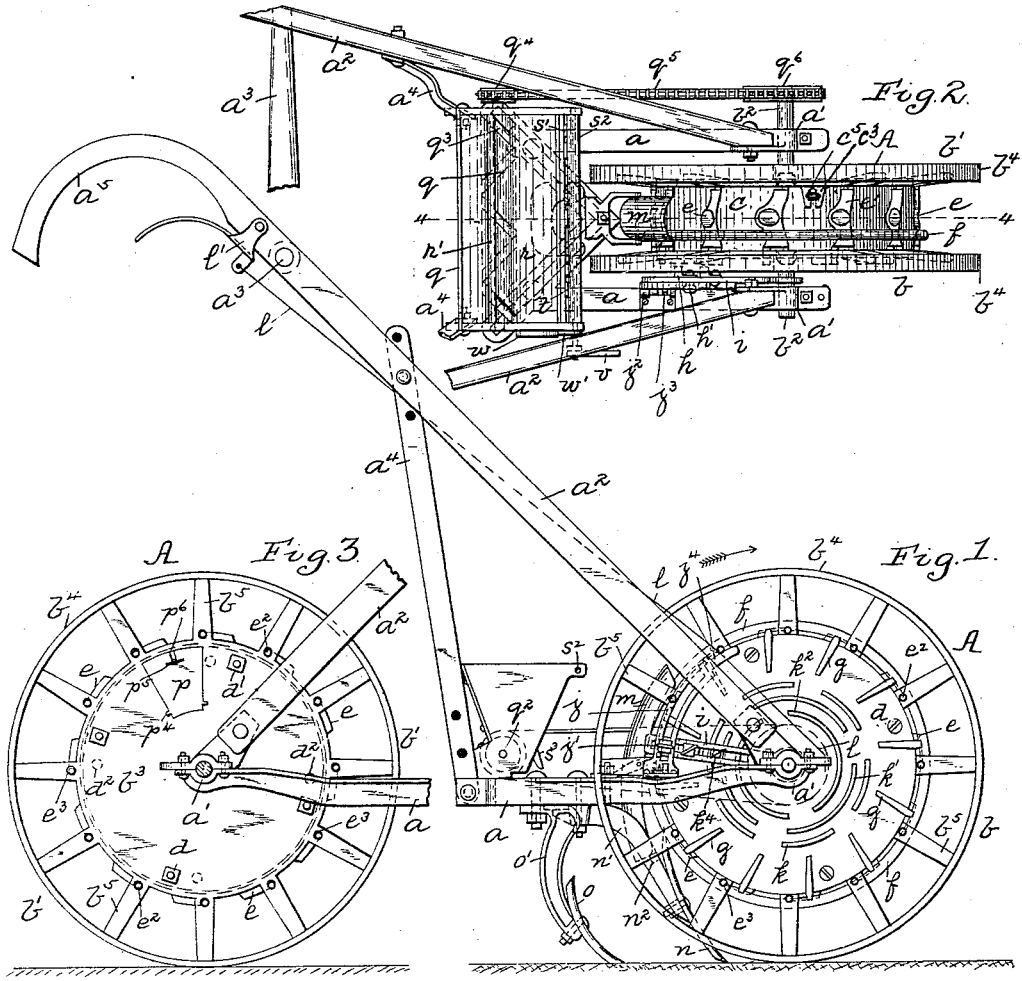
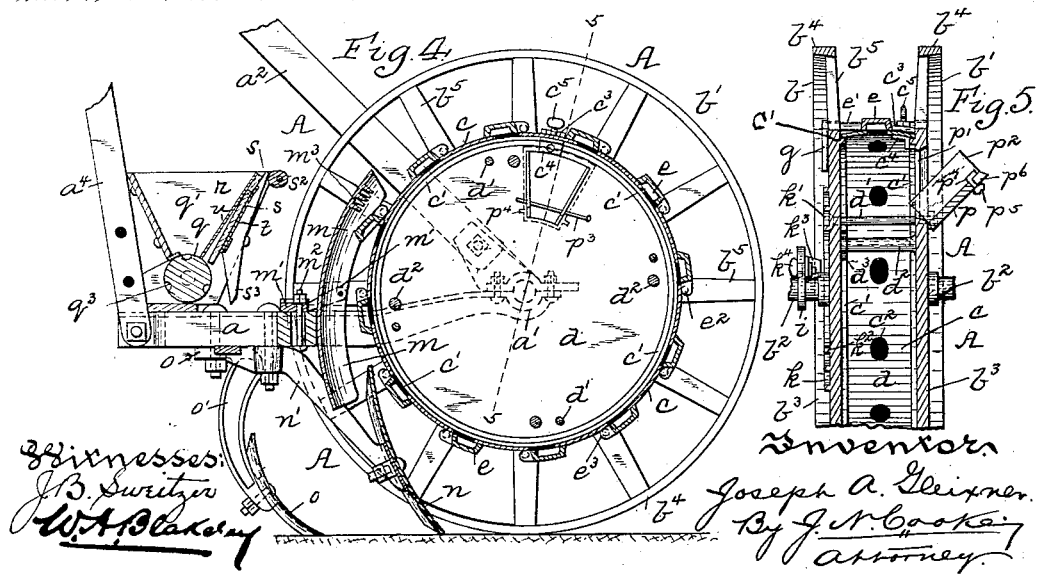
Witnesses:
B. Sweitzer
W. A. Blakeley
Inventor:
Joseph A. Gleixner.
By J. N. Cooke
Attorney (No Model.) 3 Sheets—Sheet 2.
J. A. GLEIXNER.
SEED SOWER.
No. 602,683. Patented Apr. 19, 1898.
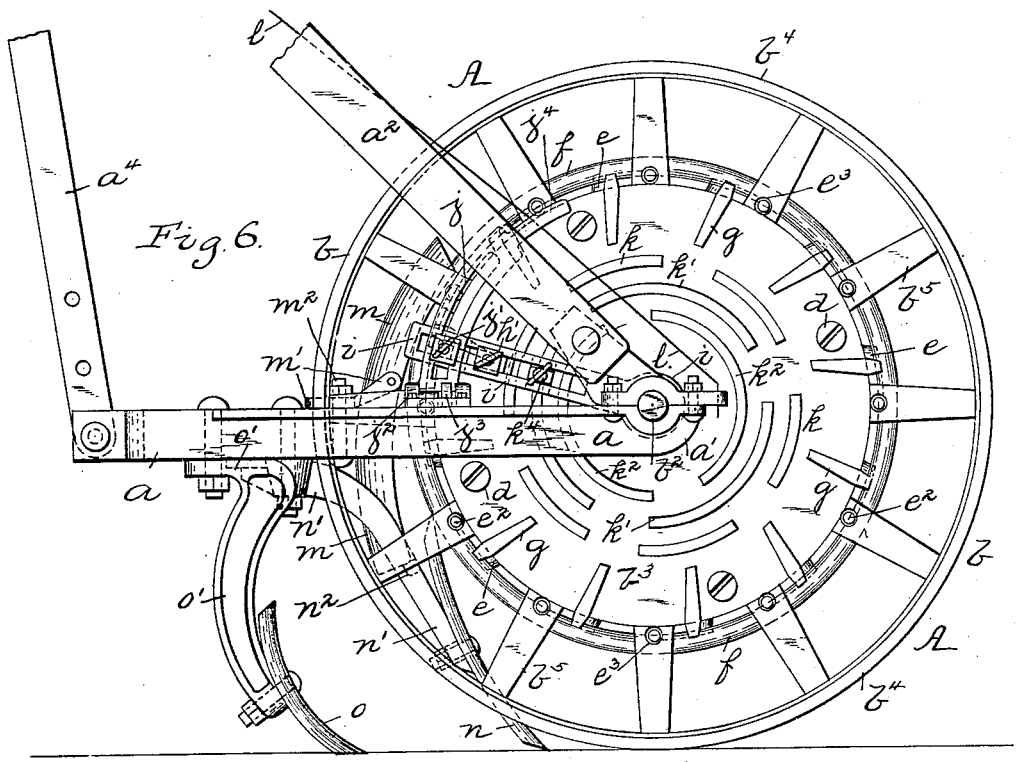
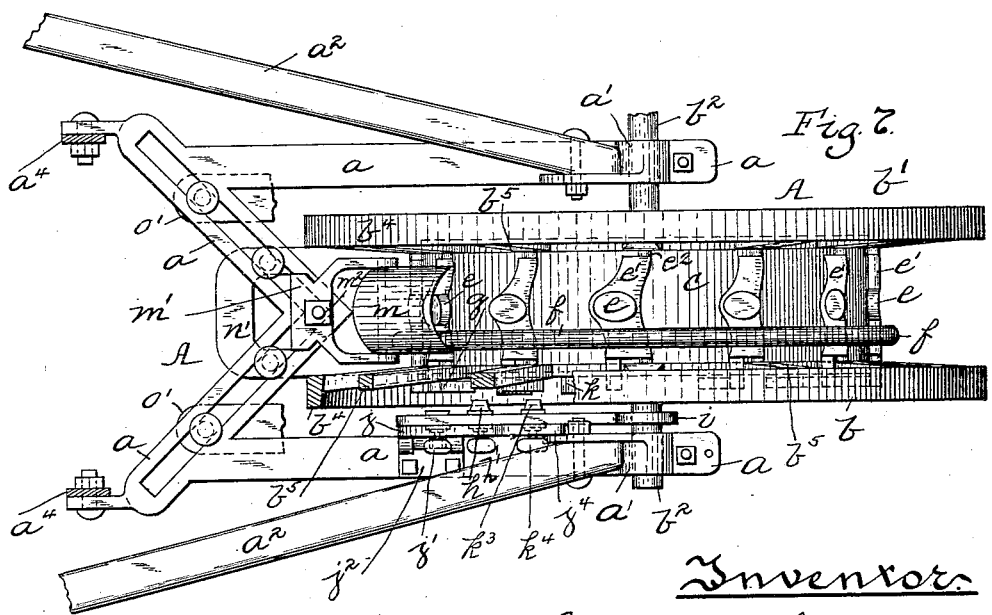
Witnesses:
W. A. Blakeley
J. B. Switzer
Inventor:
Joseph A. Gleixner
By J. W. Cooke
Attorney
THE NORRIS PETERS CO., PHOTO-LITHO., WASHINGTON, D. C.

(No Model.)   3 Sheets—Sheet 3.
J. A. GLEIXNER.
SEED SOWER.
No. 602,683.   Patented Apr. 19, 1898.
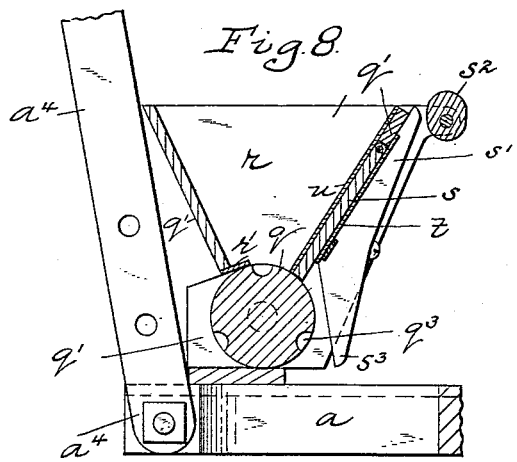
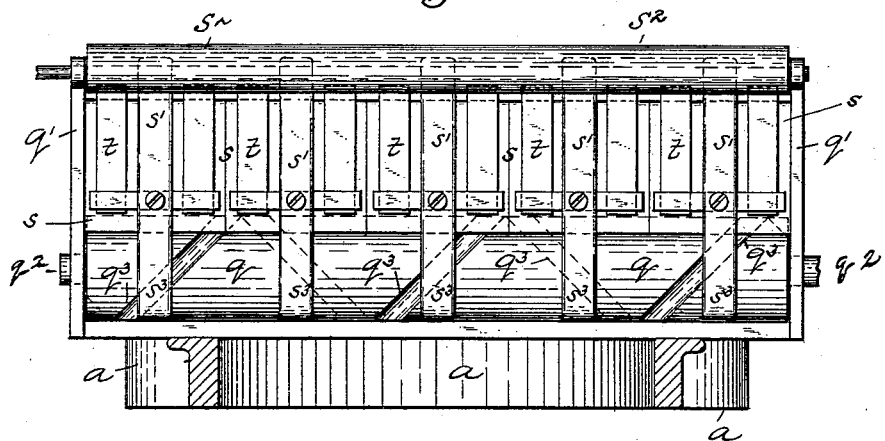
Witnesses:
G. K. Wright
W. H. Blakely
Inventor:
Joseph A. Gleixner
By J. N. Cooke
Attorney
THE NORRIS PETERS CO., PHOTO-LITHO., WASHINGTON, D. C.

UNITED STATES PATENT OFFICE.

JOSEPH A. GLEIXNER, OF FAIR HAVEN, PENNSYLVANIA.

SEED-SOWER.

SPECIFICATION forming part of Letters Patent No. 602,683, dated April 19, 1898.

Application filed March 22, 1897. Serial No. 628,631. (No model.)

*To all whom it may concern:*

Be it known that I, JOSEPH A. GLEIXNER, a citizen of the United States, residing at Fair Haven, in the county of Allegheny and State of Pennsylvania, have invented certain new and useful Improvements in Seed-Sowers; and I do hereby declare the following to be a full, clear, and exact description thereof.

My invention relates to seed-sowers, and has special reference to that class of seed-sowers such as is set forth in Letters Patent of the United States granted to myself and Peter Schaff on May 2, 1893, No. 496,515, and on February 20, 1894, No. 515,208.

The object of my invention is to provide a cheap and simple seed-sower which will sow any kind of garden or field seeds by hand from a hopper or cylinder, although certain improvements may be added for power-operated sowers.

A further object of my invention is to provide a seed-sower which can be regulated or adjusted to sow the seeds at different distances apart, as may be necessary in sowing certain kinds of seed; and a still further object of my invention is to provide a suitable apparatus upon the seed-sower for the dropping of any particular kind of fertilizer desired upon the ground after the seed has been dropped from the sower.

My invention consists, generally stated, in the novel construction, combination, and arrangement of the various parts of the device, as hereinafter more specifically set forth and described, and particularly pointed out in the claims.

To enable others skilled in the art to which my invention appertains to construct and use the same, I will describe the same more fully, referring to the accompanying drawings, in which—

Figure 1 is a side view of my improved seed-sower. Fig. 2 is a top or plan view thereof. Fig. 3 is a view looking at the opposite side of the wheels from that shown in Fig. 1. Fig. 4 is a longitudinal central section on the line 4 4, Fig. 2. Fig. 5 is a vertical section through the wheels on the line 5 5, Fig. 4. Fig. 6 is an enlarged side view with the fertilizer-distributer removed. Fig. 7 is an enlarged plan view, partly in section, with the fertilizer-distributer removed. Fig. 8 is an enlarged cross-section of the hopper and feed-roll, and Fig. 9 is an enlarged front view of the hopper and feed-roll.

Like letters herein indicate like parts in each of the figures of the drawings.

My improved seed-sower is shown at A and is provided with the frame $a$, having the bearings $a'$ formed at the forward end thereof, within which are journaled the trunnions $b^2$ $b^2$, formed on the body portions $b^3$ $b^3$ of the wheels $b$ $b'$, upon which the seed-sower A moves or travels. Inclined bars $a^2$ extend up on both sides of the wheels $b$ $b'$ from the bearings $a'$ and are suitably braced by the bar $a^3$, extending across between the same and the upright rods $a^4$, which are connected to the inclined bars $a^2$ and the frame $a$ and are capable of adjustment to regulate different heights of the inclined bars $a^2$, which terminate in the handles $a^5$.

The wheels $b$ $b'$ are preferably formed of cast metal and are provided with the fellies $b^4$, which are connected to the body portions $b^3$ $b^3$ by the braces or spokes $b^5$. Between the wheels $b$ $b'$ is the metal band $c$, curved in cross-section, which rests upon flanges or lugs $c'$ on the body portions $b^3$ $b^3$ of the wheels $b$ $b'$, so as to form the hopper or cylinder $d$ between the wheels $b$ $b'$, these parts being clamped together by means of the bolts $d'$, passing through the body portions $b^3$ $b^3$ of the wheels $b$ $b'$. Posts $d^2$ are formed on one of the body portions $b^3$ within the cylinder $d$, which enter within and are centered in the sockets $d^3$ in the opposite body portion $b^3$ for holding and supporting the wheels $b$ $b'$ apart and in line with each other. Around the metal band $c$ are a number of openings $c^2$, communicating with the cylinder $d$, and rigidly secured and projecting out from one of the body portions $b^3$ $b^3$ of the wheels $b$ $b'$ on the outer and inner faces of the metal band $c$ are the lugs $c^3$ $c^4$. A set-screw $c^5$ is adapted to pass through the lug $c^3$ and engage with the center face of the metal band $c$ to permit the movement of the metal band $c$ and vary the size of the openings $c^2$ therein, as hereinbefore described. Opposite each one of the openings $c^2$ in the metal band $c$ are the pockets $e$, which are formed as part of a common bar $e'$, having journals $e^2$ on each end thereof journaled in suitable bearings $e^3$ in the spokes $b^5$ of the wheels $b$ $b'$. In order to retain the pockets $e$ normally in such position, so as to close the openings $c^2$, a circular spiral spring $f$ is provided, which fits around the cylinder $d$ and over the bars $e'$ between the wheels $b\,b'$. Projecting out from the bars $e'$ and preferably down along the outside of the body portions $b^3$ of the wheel $b$ are the fingers $g$, which are formed as part of the bars $e'$ and are adapted to engage with a lug $h$, fitting within a slotted bar $i$, mounted loosely around the trunnion $b^2$ on the wheel $b$. The lug $h$ is adapted to slide within the slotted bar $i$ and is provided with the set-screw $h'$ thereon for securing the same in any desired position, so as to limit the throw of the fingers $g$ to vary the amount of seed to be dropped from the pockets $e$. The slotted bar $i$ is secured by means of a set-screw $j'$ to a segmental slotted lever $j$, which is hinged at $j^2$ to the frame $a$, and a spring $j^3$ is secured to the frame $a$ and presses against the segmental lever $j$. A series of segmental lugs $k\,k'\,k^2$ are formed on different radii from the center of the trunnion $b^2$ on the wheel $b$ around the body portion $b^3$ on the wheel $b$, with which a lug $k^3$, which moves or slides in the slotted bar $i$, is adapted to travel on the slotted bar $i$ to regulate the distance desired to sow the seed or grain apart. The lug $k^3$ is provided with a set-screw $k^4$ thereon to secure the same within the slotted bar $i$ at any place desired.

A rod $l$ is connected to the frame $a$ in front of the bearing $a'$ and passes around and engages with a finger $j^4$ on the segmental lever $j$. The rod $l$ is connected to a hand-lever $l'$, pivoted on one of the inclined bars $a^2$, and when the lever $l'$ is raised it throws the segmental lever $j$ back, through the engagement of the rod $l$ with the finger $j^4$, which throws the lug $h$ out of engagement from the fingers $p$ when desired. A discharging-chute $m$ is secured on the frame $a$ within the bracket $m'$, secured to the frame $a$ by means of a bolt $m^2$, passing through bracket $m'$ and chute $m$, so permitting the movement of the chute when desired. The chute is provided with the series of lugs $m^3$ on its inner face at one end thereof, which break joint with each other and act to form a rough surface for the purpose of more thoroughly distributing certain kinds of seed fed thereto from the pockets $e$ before reaching the earth. The opposite end of the chute $m$ is provided with a plain surface for sowing certain other kinds of seed, and either end of the chute $m$ can be used, when desired, by the removal of the bolt $m^2$. A shovel $n$ is secured in front of the chute $m$ to open the earth for the entrance of the seed or grain distributed through the chute $m$ from the pockets $e$, and the shovel $n$ is held in place by means of a bracket $n'$, secured thereto and connected to the frame $a$.

The lower end of the chute $m$ can rest upon a lug $n^2$, formed on the bracket $n'$, to steady the same. Coverers $o\,o$ are held in brackets $o'\,o'$, secured to the frame $a$, for engaging with the earth to cover up the seed or grain dropped into the hole or furrow made by the shovel $n$. An opening $p'$ is formed in the body portion $b^3$ of the wheel $b'$, within which a door $p$ is adapted to fit, which is provided with the flanges $p^2$ on each side of its inner face to form an inclined spout when opened, as shown in Fig. 5, for the entrance of seed or grain into the cylinder $d$. A rod $p^3$ connects the flanges $p^2$ and the sides of the opening $p'$ in the wheel $b'$ to hold the door $p$ when opened, and lugs $p^4$ are formed on the door $p$ to hold the door in place when closed. A set-screw $p^5$ slides within a slot $p^6$ in door $p$, and is provided with a bur or lug $p^7$ on its inner face to engage with the top of the opening $p'$ in the wheel $b'$ for holding the door $p$ in its closed position.

Secured within a box $q'$ on the frame $a$ is the fertilizer-distributer, which consists of a roll $q$, mounted on a shaft $q^2$ within the box $q'$, and having on its outer face a series of spiral grooves $q^3$ therein extending throughout its length. A sprocket-wheel $q^4$ is secured on one end of the shaft $q^2$, having a sprocket-chain $q^5$ connected thereto and connected to a sprocket-wheel $q^6$ on the trunnion $b^2$ of the wheel $b'$. A hopper $r$ is formed in the box $q'$, above the roll $q$, for the fertilizer used to feed to the roll $q$, and a flexible plate $r'$ is secured to the rear of the box $q'$ and is adapted to press against the roll $q$ to prevent friction and prevent the escape of the fertilizer from the hopper $r$. A series of shutters $s$ are pivoted to the front of the box $q'$, having a bar or lug $s'$ secured to each one of the shutters $s$, which is adapted to engage with an eccentric-shaft $s^2$, secured in bearings at the upper part of the box $q'$, for the purpose of permitting the shutters $s$ to be opened to drop and regulate the amount of fertilizer fed to the acre from the hopper $r$ through the grooves $q^3$ around the roll $q$ to the earth in front of the coverers $o\,o$.

Each one of the shutters $s$ is provided with the thumb-lever $s^3$ thereon for raising the shutters $s$ in case of the quick discharge of the fertilizer from the hopper, which can be caught in any suitable receptacle. Springs $t$ are secured to each one of the shutters $s$ and are adapted to press against the box $q'$, and a flexible apron $u$ is secured to the inner side of the box $q'$ and is adapted to press against the roll $q$ to prevent friction on the roll and prevent clogging of the shutters $s$ and to remove the surplus, so allowing the passage of the fertilizer out through the shutters $s$. A hand-lever $v$ can be placed on the eccentric-shaft $s^2$ to turn the same, and a finger $w'$ can be mounted on the shaft $s^2$ for engaging with a suitable registering and recording mechanism $w$ to ascertain by means of a dial the amount of fertilizer fed from the hopper $r$ to the acre.

The operation of my improved seed-sower is as follows: The parts of the seed-sower A being adjusted and in proper position, as shown in Fig. 1, the seed or grain can be introduced into the cylinder $d$ by opening the door $p$, as shown in Fig. 5, which forms the chute therefor, when the sower is ready for sowing. As the operator grasps the handles $a^5$ and pushes the seed-sower A along, the wheels $b\ b'$ will travel over the soil, and upon the ascent of the cylinder $d$ the pockets $e$ will be filled with seed or grain therefrom through the openings $c^2$ in the metal band $c$, and the ascent of the cylinder $d$ brings the fingers $g$ on the bars $e'$ into contact with the lug $h$ on the slotted bar $i$, and when one of the fingers $g$ comes in contact with the lug $h$ on the slotted bar $i$ that particular bar $e'$ will raise and discharge the seed or grain from the pocket $e$ on said bar $e'$ into the chute $m$ and down through the same in the rear of the shovel $n$ into the furrow made by the shovel $n$ as the seed-sower A is moved along, as above stated. As the wheels $b\ b'$ of the seed-sower A are revolved, the shaft $q^2$ on the roll $q$ is revolved through the medium of the sprocket-wheel $q^4$ thereon connecting by the chain $q^5$ to the sprocket-wheel $q^6$ on the trunnion $b^2$ of the wheel $b'$, so causing the fertilizer contained within the hopper $r$ of the box $q'$ to pass around the roll $q$ in the grooves $q^3$ therein and escape under the shutters $s$ down through the frame $a$ in front of the coverers $o\ o$ into the furrow made by the shovel $n$, where the fertilizer and seed or grain can be covered up with soil thrown by the coverers $o\ o$ as the seed-sower A moves along.

In case it is desired to sow the seed or grain at a greater distance apart than by the emptying of each pocket $e$ by the lug $h$ upon the revolution of the wheels $b\ b'$, the lug $k^3$ can be moved within the slotted bar $i$ and secured by the set-screw $k^4$, so that the lug $k^3$ will come in contact with the segmental lugs $k$ on the body portion $b^3$ of the wheel $b$, which will raise the slotted bar $i$ and segmental lever $j$ and cause the lug $h$ on the slotted lever $i$ to pass or skip one of the fingers $g$, so causing every other pocket $e$ to be emptied as the wheels $b\ b'$ of the seed-sower A are revolved.

By moving the lug $k^3$ in the slotted arm $i$, so that it is opposite and comes in contact with the lugs $k'$ on the wheel $b$, only three of the pockets $e$ will be emptied, and by moving the lug $k^3$ so that it comes in contact with the lugs $k^2$ only two of the pockets $e$ will be emptied upon the revolution of the wheels $b\ b'$, and any number of lugs can be put upon the body portion $b^3$ of the wheel $b$ in order to empty as many of the pockets $e$ as desired during the operation of the seed-sower.

The size of the openings $c^2$ in the metal band $c$, which communicate with the cylinder $d$ and pockets $e$, can be varied so as to admit the exact quantity or size of the seed required by loosening the set-screw $c^5$ in the lug $c^3$ and moving the metal band $c$ the distance required, when the screw $c^5$ can be tightened up by pressing the same against the metal band $c$ and forcing the same against the lug $c^4$. The lug $h$ can be thrown out of engagement with the fingers $g$ at any time during the operation of the seed-sower A by the operator pressing on the lever $l'$, pivoted to the inclined bar $a^2$, so tightening the rod $l$ and drawing the slotted bar $i$ with its lug $h$ and segmental lever $j$ out from contact of the lug $h$ with the fingers $g$. The lug $k^3$ on the slotted bar $i$ can be released from contact with the lugs $k\ k'\ k^2$ in like manner when such lug $k^3$ is in operation, and when the lever $l'$ is released the spring $j^3$ will force the slotted bar $i$ and segmental lever $j'$ back to their normal positions, so that the lug $h$ will operate on the fingers $g$ and the lug $k^3$ will operate on the lugs $k\ k'\ k^2$ if so set. By raising or lowering the slotted bar $i$ on the segmental lever $j$ by means of the set-screw $j'$ the throw of the fingers $g$ on the pockets $e$ coming in contact with the lug $h$ on the slotted bar $i$ can be changed at will, so varying the raising of the bar $e'$ and the amount of seed or grain to be dropped from the pockets $e$ into the chute $m$ to the earth. The seed-sower A can be hauled backward without operating the same, as the lugs $h$ and $k^3$ will ride over the fingers $g$ and lugs $k\ k'\ k^2$ and raise the slotted bar $i$ and segmental lever $j$ over the same. The chute $m$ can be reversed by unscrewing the bracket $m'$ from the frame and presenting a smooth surface to drop and pile the seed or grain, or a roughened surface, as by the lugs $m^3$ therein, to scatter the seed or grain as desired. The amount of fertilizer fed to the acre can be varied at will by moving the eccentric-shaft $s^2$ up against the lugs $s'$ on the shutters $s$, so opening up the space between the shutters $s$ and the roll $q$ as desired, and by grasping the levers $s^3$ and raising the shutters $s$ the amount of fertilizer within the hopper $r$ can be diminished or quickly discharged into any suitable receptacle, after which, upon releasing the levers $s^3$, the shutters $s$ will spring back to place through the medium of the spring $t$ and allowing the shutters $s$ to assume their closed position.

It will thus be seen that my improved seed-sower is simple in its construction and effective in its operation. It is strong and durable in its parts and will not get out of order. It can be manufactured cheaply and will sow any kind or quantity of seeds or grain at any desired distance apart and at any particular depth in the earth and will not operate when hauled backward.

What I claim as my invention, and desire to secure by Letters Patent, is—

1. In seed-sowers, the combination of a frame, a revolving cylinder within the frame having openings therein, spring-actuated pockets covering said openings and journaled on the exterior of said cylinder, a lug or finger on said frame for engaging with said pockets upon the revolution of the cylinder, whereby said pockets are raised, and projections on said cylinder for raising said lug or finger out of engagement with the pockets, substantially as and for the purposes set forth.

2. In seed-sowers, the combination of a frame, a revolving cylinder within the frame having openings therein, spring-actuated pockets covering said openings and journaled on the exterior of said cylinder, a slotted segmental lever on said frame, a slotted bar secured thereto, a lug or finger on said slotted arm for engaging with the pockets upon the revolution of the cylinder, whereby said pockets are raised, and a series of radial projections or lugs on said cylinder adapted to engage with a finger or lug on the slotted bar for raising said first-mentioned lug or finger out of engagement with the pockets, substantially as and for the purposes set forth.

3. In seed-sowers, the combination of a frame, a revolving cylinder having openings therein and provided with trunnions thereon journaled in the frame, spring-actuated pockets covering said openings and journaled on the exterior of the cylinder, a slotted segmental lever hinged to said frame, a slotted bar secured to said segmental lever and loosely mounted around one of the trunnions of the cylinder, a lug or finger on the slotted bar for engaging with the pockets upon the revolution of the cylinder, whereby said pockets are raised, and a series of radial projections or lugs on the side of the cylinder adapted to engage with a movable finger or lug on the slotted bar for raising said first-mentioned lug or finger out of engagement with the pockets, substantially as and for the purposes set forth.

4. In seed-sowers, the combination of a frame, driving-wheels journaled in the forward end of said frame, a revolving cylinder between said driving-wheels having openings therein, spring-actuated pockets covering said openings and journaled on the exterior of said cylinder, mechanism for engaging with said pockets upon the revolution of said cylinder, whereby said pockets are raised, and mechanism for engaging with any one of said pockets to raise the same upon the revolution of the cylinder, substantially as and for the purposes set forth.

5. In seed-sowers, the combination of a frame, a revolving cylinder within the frame having openings therein, spring-actuated pockets covering said openings and journaled on the exterior of said cylinder, mechanism for engaging said pockets upon the revolution of the cylinder, whereby said pockets are raised, and a reversible chute secured on said frame provided with a roughened surface at one end and a smooth surface at the opposite end, substantially as and for the purposes set forth.

6. In seed-sowers, the combination of a frame, driving-wheels journaled in the forward end of said frame, lugs or flanges on the inner faces of the driving-wheels, a movable band curved in cross-section having openings therein resting on said lugs or flanges and adapted to form the face of a cylinder between the driving-wheels, spring-actuated pockets covering said openings and journaled on the exterior of the cylinder, and mechanism for engaging with said pockets upon the revolution of the cylinder whereby said pockets are raised, substantially as and for the purposes set forth.

7. In seed-sowers, the combination of a frame, driving-wheels journaled in the forward end of said frame, lugs or flanges on the inner faces of the driving-wheels, a movable band curved in cross-section having openings therein resting on said lugs or flanges and adapted to form the face of a cylinder between the driving-wheels, spring-actuated pockets covering said openings and journaled on the exterior of said cylinder, mechanism for engaging said pockets upon the revolution of the cylinder, whereby said pockets are raised, and a lug or bearing on said driving-wheels having a set-screw therein for engaging with the adjustable face of the cylinder to vary the size of the openings therein, substantially as and for the purposes set forth.

8. In seed-sowers, the combination of a frame, driving-wheels journaled in the forward end of said frame, lugs or flanges on the inner faces of the body portions of the driving-wheels, a movable band curved in cross-section having openings therein resting on said lugs or flanges and adapted to form the faces of a cylinder between the driving-wheels, spring-actuated pockets covering said openings and journaled on the exterior of the cylinder, mechanism for engaging said pockets upon the revolution of the cylinder, whereby said pockets are raised and posts on one of the body portions of the driving-wheels adapted to engage with pockets on the body portions of the opposite driving-wheels within the cylinder, substantially as and for the purposes set forth.

9. In seed-sowers, the combination of a frame, a revolving cylinder within the frame having openings therein, spring-actuated pockets covering said openings and journaled on the exterior of said cylinder, a slotted segmental lever on said frame, a slotted bar secured thereto and having a lug or finger thereon for engaging with the pockets upon the revolution of the cylinder, whereby said pockets are raised, and a lever having a rod connected thereto engaging with the segmental lever and the frame to raise the segmental lever and the lug or finger on the slotted bar out of contact with pockets, substantially as and for the purposes set forth.

10. In seed-sowers, the combination of a frame, a revolving cylinder within the frame, an opening in the side of said cylinder having a door therein for the introduction of seed or grain into the cylinder, flanges extending out on both sides of the inner face of said door, and a rod on the lower end of said door adapted to engage with the edges of the opening to hold the door when opened, substantially as and for the purposes set forth.

11. In seed-sowers, the combination of a frame, a revolving cylinder within the frame, an opening in the side of said cylinder having a door therein for the introduction of seed or grain into the cylinder, flanges extending out on both sides of the inner face of said door, and a slot in said door having a thumb-nut therein provided with a lug thereon for engaging with the edge of the opening, substantially as and for the purposes set forth.

12. In seed-sowers, the combination of a frame, a revolving cylinder within the frame having openings therein, pockets covering said openings and journaled on the exterior of said cylinder, mechanism for engaging said pockets upon the revolution of the cylinder whereby the pockets are raised, and a circular spiral spring fitting around the cylinder and engaging with the pockets to return them to their normal position when raised, substantially as and for the purposes set forth.

13. In seed-sowers, the combination with a frame having a revolving cylinder therein, of a box or hopper on said frame, a roll journaled in the box or hopper, and connections from said revolving cylinder to the roll to operate the same, substantially as and for the purposes set forth.

14. In seed-sowers, the combination with a frame having a revolving cylinder therein, of a box or hopper on said frame, a roll journaled in the box or hopper, connections from said revolving cylinder to the roll to operate the same, and spiral grooves around and within the face of said roll, substantially as and for the purposes set forth.

15. In seed-sowers, the combination with a frame having a revolving cylinder therein, of a box or hopper on said frame, a roll journaled in the box or hopper and provided with spiral grooves around and within its face, connections from the revolving cylinder to the roll to operate the same, and spring-operated shutters within said box or hopper, substantially as and for the purposes set forth.

16. In seed-sowers, the combination with a frame having a revolving cylinder therein, of a box or hopper on said frame, a roll journaled in the box or hopper, connections from said revolving cylinder to the roll to operate the same, spring-operated shutters within the box or hopper, and a flexible apron secured to the box or hopper in front of the shutters, and adapted to bear against the roll, substantially as and for the purposes set forth.

17. In seed-sowers, the combination with a frame having a revolving cylinder therein, of a box or hopper on said frame, a roll journaled in the box or hopper, connections from the revolving cylinder to the roll to operate the same, spring-operated shutters within the box or hopper, and an eccentric or cam adapted to engage with the spring-operated shutters to regulate the opening of the same, substantially as and for the purposes set forth.

18. In seed-sowers, the combination with a frame having a revolving cylinder therein, of a box or hopper on said frame, a roll journaled in the box or hopper, connections from the revolving cylinder to the roll to operate the same, spring-operated shutters within the box or hopper, and a flexible strip in the front of the box or hopper adapted to engage with roll, substantially as and for the purposes set forth.

19. In seed-sowers, the combination with a frame having a revolving cylinder therein, of a box or hopper on said frame, a roll journaled in said box or hopper, connections from the revolving cylinder to the roll to operate the same, spring-operated shutters within the roll or hopper, an eccentric mounted on a shaft and adapted to engage with the spring-operated shutters to regulate the opening of the same, and mechanism connected to said shaft for regulating the amount of fertilizer dropped from the box or hopper around the roll, substantially as and for the purposes set forth.

In testimony whereof I, the said JOSEPH A. GLEIXNER, have hereunto set my hand.

JOSEPH A. GLEIXNER.

Witnesses:
  J. N. COOKE,
  GEO. B. NEAL.